US009538732B2

(12) United States Patent
Finkel et al.

(10) Patent No.: US 9,538,732 B2
(45) Date of Patent: Jan. 10, 2017

(54) METHODS AND MATRICES FOR PROMOTING FAUNA AND FLORA GROWTH

(71) Applicant: ECONCRETE TECH LTD., Tel-Aviv (IL)

(72) Inventors: Shimrit Finkel, Tel-Aviv (IL); Ido Sella, Tel Aviv (IL)

(73) Assignee: ECONCRETE TECH LTD., Tel-Aviv (IL)

( * ) Notice: Subject to any disclaimer, the term of this patent is extended or adjusted under 35 U.S.C. 154(b) by 0 days.

(21) Appl. No.: 14/767,885

(22) PCT Filed: Feb. 13, 2014

(86) PCT No.: PCT/IL2014/050164
§ 371 (c)(1),
(2) Date: Aug. 13, 2015

(87) PCT Pub. No.: WO2014/125493
PCT Pub. Date: Aug. 21, 2014

(65) Prior Publication Data
US 2015/0366170 A1   Dec. 24, 2015

Related U.S. Application Data

(60) Provisional application No. 61/764,800, filed on Feb. 14, 2013.

(51) Int. Cl.
*A01K 61/00*   (2006.01)
*A01G 31/00*   (2006.01)
(Continued)

(52) U.S. Cl.
CPC ............. *A01K 61/006* (2013.01); *A01G 1/001* (2013.01); *A01G 31/00* (2013.01); *A01G 31/02* (2013.01);
(Continued)

(58) Field of Classification Search
CPC .......... A01G 7/00; A01G 31/00; A01G 31/02; A01K 61/00; A01K 61/006; C04B 28/00; C04B 28/04
(Continued)

(56) References Cited

U.S. PATENT DOCUMENTS 556,436 A    3/1896  Pohle
5,564,369 A  10/1996 Barber et al.
(Continued)

FOREIGN PATENT DOCUMENTS

AU    2010100170 A4   5/2010
EP    0134855 A1      3/1985
(Continued)

OTHER PUBLICATIONS

International Search Report for PCT/IL2014/050164, dated Apr. 28, 2014, (3 pages).
(Continued)

*Primary Examiner* — David Parsley
(74) *Attorney, Agent, or Firm* — Shumaker, Loop & Kendrick, LLP

(57) ABSTRACT

The invention provides a marine infrastructure comprising a concrete matrix having a pH of less than 12 for use in promoting the growth of fauna and flora in aquatic environment, and methods for promoting the growth of fauna and flora in aquatic environment, including endolitic and epilitic flora and endolitic and epilitic anaerobic and aerobic flora and fauna.

19 Claims, 9 Drawing Sheets

(51) Int. Cl.
  A01G 31/02    (2006.01)
  C04B 28/00    (2006.01)
  C04B 28/04    (2006.01)
  C04B 28/02    (2006.01)
  C04B 28/06    (2006.01)
  A01G 1/00     (2006.01)
  E02B 3/04     (2006.01)
  C04B 111/00   (2006.01)
  C04B 111/24   (2006.01)
  C04B 111/74   (2006.01)

(52) U.S. Cl.
  CPC .............. *A01K 61/00* (2013.01); *C04B 28/00* (2013.01); *C04B 28/02* (2013.01); *C04B 28/04* (2013.01); *C04B 28/06* (2013.01); *E02B 3/046* (2013.01); *C04B 2111/00112* (2013.01); *C04B 2111/00732* (2013.01); *C04B 2111/24* (2013.01); *C04B 2111/74* (2013.01); *E02B 2201/02* (2013.01)

(58) Field of Classification Search
  USPC ...... 47/1.01 R, 59 R, 63; 119/200, 204, 215, 119/221, 234, 238; 106/713, 737, 739, 106/788
  See application file for complete search history.

(56) References Cited

U.S. PATENT DOCUMENTS

| | | | |
|---|---|---|---|
| 6,186,702 B1 | 2/2001 | Bartkowski et al. | |
| 7,144,196 B1 | 12/2006 | Campbell et al. | |
| 7,997,231 B2* | 8/2011 | Fernandez | A01K 61/006 119/221 |
| 8,312,843 B2* | 11/2012 | Ortego | A01K 61/002 119/210 |
| 2006/0147656 A1 | 7/2006 | Mathieu | |
| 2009/0269135 A1 | 10/2009 | Arvai et al. | |

FOREIGN PATENT DOCUMENTS

| | | |
|---|---|---|
| JP | 2002000112 A | 1/2002 |
| JP | 2002000112 A | 8/2002 |
| WO | 2004/031096 A1 | 4/2004 |

OTHER PUBLICATIONS

International Preliminary Report on Patentability for PCT/IL2014/050164, dated Jul. 22, 2015, (7 pages).
Bulleri, F. & Chapman, M. G. (2010) The introduction of coastal infrastructure as a driver of change in marine environments. Journal of Applied Ecology, 47, 26-35 (10 pages).
Chapman, M. G. & Underwood, A. J. (2011) Evaluation of ecological engineering of "armoured" shorelines to improve their value as habitat. Journal of Experimental Marine Biology and Ecology, 400, 302-313.
Connell, S. D. & Glasby, T. M. (1999) Do urban structures influence local abundance and diversity of subtidal epibiota? A case study from Sydney Harbour, Australia. Marine Environmental Research, 47, 373-387.
Dugan, J. E., Airoldi, A., Chapman, M. G., Walker, S. & Schlacher, T. (2011) Estuarine and Coastal Structures: Environmental Effects, A Focus on Shore and Nearshore Structures. In Wolanski, E., Elliott, M. & Dugan, J. E. (Eds.) Treatise on Estuarine and Coastal Science: vol. 8., Human-induced problems (uses and abuses). New York, Elsevier (pp. 17-41).
Dyson, K. L. (2009) Habitat Enhancing Marine Structures: Creating habitat in urban waters. Master of Marine Affairs Thesis. School of Marine Affairs, College of Ocean and Fishery Sciences, University of Washington (156 pages).
Glasby, T. M., Connell, S. D., Holloway, M. G. & Hewitt, C. L. (2007) Nonindigenous biota on artificial structures: could habitat creation facilitate biological invasions? Marine Biology, 151, 887-895.
Goff, M. (2010) Evaluating Habitat Enhancements of an Urban Intertidal Seawall: Ecological Responses and Management Implications. MSc Thesis University of Washington (105 pages).
Jayakumar, S. & Saravanane, R. (2010) Biodeterioration of Coastal Concrete Structures by Marine Green Algae. International Journal of Civil Engineerng, 8, 352-361.
Jones, C. G., Lawton, J. H. & Shachak, M. (1994) Organisms as ecosystem engineers. Oikos, 69, 373-386.
Lam, N. W. Y., Huang, R. & Chan, B. K. K. (2009) Variations in Intertidal Asemblages and Zonation Patterns between Vertical Artificial Seawalls and Natural Rocky Shores: A Case Study from Victoria Harbour, Hong Kong. Zoological Studies, 48 (2), 184-195.
Li, B., Reeve, D. E. & Fleming, C. A. (2005) Design for enhanced marine habitats in coastal structures. Proceedings of the Institution of Civil Engineers-Maritime Engineering, 158, 115-122.
Lukens, R. R. & Selberg., C. (2004) Guidelines for Marine Artificial Reef Materials. A Joint Publication of the Gulf and Atlantic States Marine Fisheries Commissions (205 pages).
Naylor, L. A., Venn, O., Coombes, M.A., Jackson, J. Thompson, R.C. (2011) Including Ecological Enhancements in the Planning, Design and Construction of Hard Coastal Structures: A process guide. Report to the Environment Agency (PID 110461). University of Exeter (71 pages).
Perkol-Finkel, S., Ferrario, F., Nicotera, V. & Airoldi, L. (2012) Conservation challenges in urban seascapes: promoting the growth of threatened species on coastal infrastructures. Journal of Applied Ecology, 49, 1457-1466.
Risinger, J. D. (2012) Biologically Dominated Engineered Coastal Breakwaters. PhD Thesis, Department of Biological and Agricultural Engineering. Louisiana State University and Agricultural and Mechanical College (139 pages).
Scott, P. J. B., Moser, K. A. & Risk, M. J. (1988) Bioerosion of Concrete and Limestone by Marine Organisms: A 13 year Experiment from Jamaica. Marine Polhttion Bulletin, vol. 19, (5), 219-222.
Wiecek, D. (2009) Environmentally Friendly Seawalls: A Guide to Improving the Environmental Value of Seawalls and Seawall-lined Foreshores in Estuaries, Department of Environment and Climate Change NSW on behalf of Sydney Metropolitan Catchment Management Authority (34 pages).
Creel, Liz (2003) Ripple Effects: Population and Coastal Regions; Making the Link, Population Reference Bureau (8 pages).
European Environment Agency (2000), Annual Report 1999, (60 pages).
Cencini, Carlo (1998) Physical Processes and Human Activities in the Evolution of the Po Delta, Italy, Journal of Coastal Research, vol. 14, No. 3, 774-793.
Connell, Sean D. (2000), Floating pontoons create novel habitats for subtital epibiota, Journal of Experimental Marine Biology and Ecology, 247, 183-194.
Department of Environment and Conservation (NSW), Environmental Best Management Practice Guideline for concreting Contractors, 2004, (38 pages).
Bergen et al., (2001) Design principles for ecological engineering, Ecological Engineering 18, 201-210.
Perkol-Finkel, et al. (2008) Floating and fixed artificial habitats: Spatial and temporal patterns of benthic commmunities in a coral reef environment, Estuarine Coastal and Shelf Science, 77 491-500.
Perkol-Finkel et al. (2006) Can artificial reefs mimic natural reef communities? The roles of structural features and age, Marine Environmental Research, 61, 121-135.
Anderson, et al., (2008) Permanova+for PRIMER: Guide to Software and Statistical Methods, PRIMER-E Ltd (218 pages).
Suprenant BA Designing concrete for exposure to seawater—Low permeability is critical. Publication # C910873 1991, The Aberdeen Group (3 pages).
Al-Rabiah AR et al. "Durability Requirements for Reinforced Concrete Construction in Aggressive Marine Environments" Marine Structures 3 (1990) 285-300.

(56) References Cited

OTHER PUBLICATIONS

Chan RWM et al. Report on Concrete Admixture for Waterproofing Constructions. Sturctural Engineering Branch—Arch SD. Technical Report—Structural Material Group. Concrete Admixtures for Waterproofing Construction. Issue No./Revision No. 1/A (Dec. 1999) (41 pages).

Exemplary Technical Report submitted for receiving permit for concrete construction of the Brooklyn Borough Pier 6 NYC, USA (Oct. 2012) (5 pages).

Taylor 2012, http://www.tgdaily.com/sustainability-features/68219-living-concrete-covers-buildings-in-moss (4 pages).

International Search Report for PCT/IL2014/050164 dated Apr. 28, 2014 (3 pages).

Clarke and Gorley, (2006) PRIMER v7: User Manual/Tutorial, PRIMER-E Ltd (Part 1) (pp. 1-150).

Clarke and Gorley, (2006) PRIMER v7: User Manual/Tutorial, PRIMER-E Ltd (Part 2) (pp. 151-300).

\* cited by examiner

METHODS AND MATRICES FOR PROMOTING FAUNA AND FLORA GROWTH

TECHNOLOGICAL FIELD

The present invention provides methods for the promoting the growth of flora and fauna in terrestrial and aquatic environments.

PRIOR ART

References considered to be relevant as background to the presently disclosed subject matter are listed below:
BULLERI, F. & CHAPMAN, M. G. (2010) The introduction of coastal infrastructure as a driver of change in marine environments. *Journal of Applied Ecology,* 47, 26-35.
CHAPMAN, M. G. & UNDERWOOD, A. J. (2011) Evaluation of ecological engineering of "armoured" shorelines to improve their value as habitat. *Journal of Experimental Marine Biology and Ecology,* 400, 302-313.
CONNELL, S. D. & GLASBY, T. M. (1999) Do urban structures influence local abundance and diversity of subtidal epibiota? A case study from Sydney Harbour, Australia. *Marine Environmental Research,* 47, 373-387.
DUGAN, J. E., AIROLDI, A., CHAPMAN, M. G., WALKER, S. & SCHLACHER, T. (2011) Estuarine and coastal structures: environmental effects. A focus on shore and nearshore structures. IN WOLANSKI, E., ELLIOTT, M. & DUGAN, J. E. (Eds.) *Treatise on Estuarine and Coastal Science:* 8. *Human-induced problems* (*uses and abuses*). New York, Elsevier
DYSON, K. L. (2009) Habitat Enhancing Marine Structures: Creating habitat in urban waters. Master of Marine Affairs Thesis. School of Marine Affairs, College of Ocean and Fishery Sciences, University of Washington.
GLASBY, T. M., CONNELL, S. D., HOLLOWAY, M. G. & HEWITT, C. L. (2007) Nonindigenous biota on artificial structures: could habitat creation facilitate biological invasions? *Marine Biology,* 151, 887-895.
GOFF, M. (2010) Evaluating Habitat Enhancements of an Urban Intertidal Seawall: Ecological Responses and Management Implications. MSc Thesis University of Washington
JAYAKUMAR, S. & SARAVANANE, R. (2010) Biodeterioration of Coastal Concrete Structures by Marine Green Algae. *International Journal of Civil Engineerng,* 8, 352-361.
JONES, C. G., LAWTON, J. H. & SHACHAK, M. (1994) Organisms as ecosystem engineers. *Oikos,* 69, 373-386.
LAM, N. W. Y., HUANG, R. & CHAN, B. K. K. (2009) Variations in Intertidal assemblages and zonation patterns between vertical artificial seawalls and natural rocky shores: A case study from Victoria Harbour, Hong Kong. *Zoological Studies,* 48, 184-195.
LI, B., REEVE, D. E. & FLEMING, C. A. (2005) Design for enhanced marine habitats in coastal structures. *Proceedings of the Institution of Civil Engineers-Maritime Engineering,* 158, 115-122.
LUKENS, R. R. & SELBERG., C. (2004) Guidelines for Marine Artificial Reef Materials. *A Joint Publication of the Gulf and Atlantic States Marine Fisheries Commissions.*
NAYLOR, L. A., VENN, O., COOMBES, M. A., JACKSON, J. THOMPSON, R. C. (2011) Including Ecological Enhancements in the Planning, Design and Construction of Hard Coastal Structures: A process guide. Report to the Environment Agency (PID 110461). University of Exeter
PERKOL-FINKEL, S., FERRARIO, F., NICOTERA, V. & AIROLDI, L. (2012) Conservation challenges in urban seascapes: promoting the growth of threatened species on coastal infrastructures. *Journal of Applied Ecology,* 49, 1457-1466.
RISINGER, J. D. (2012) Biologically Dominated Engineered Coastal Breakwaters. PhD Thesis, *Department of Biological and Agricultural Engineering.* Louisiana State University and Agricultural and Mechanical College.
SCOTT, P. J. B., MOSER, K. A. & RISK, M. J. (1988) Bioerosion of Concrete and Limestone by Marine Organisms: A 13 year Experiment from Jamaica. *Marine Polhtion Bulletin,* 19, 219-222.
WIECEK, D. (2009) Environmentally Friendly Seawalls: A Guide to Improving the Environmental Value of Seawalls and Seawall-lined Foreshores in Estuaries, Department of Environment and Climate Change NSW on behalf of Sydney Metropolitan Catchment Management Authority.
U.S. Pat. No. 7,144,196
U.S. Pat. No. 6,186,702
U.S. Pat. No. 556,436
US 2006/147,656

Acknowledgement of the above references herein is not to be inferred as meaning that these are in any way relevant to the patentability of the presently disclosed subject matter.

BACKGROUND

With nearly two thirds of the human population living along the coastlines (Creel, 2003), the proliferation of coastal and marine infrastructures (CMI) that supply various societal needs such as transportation (ports), energy (pipelines, power stations, rigs) and urbanization (marinas, seawalls, breakwaters etc.) is inevitable. Nowadays >50% of Mediterraneaniterranean coastlines are dominated by concrete structures (EEA, 1999), and in some regions the growth of cities, ports, and industries has developed over 90% of the coastline (Cencini, 1998). The result is a continuous and increasing trend of coastal hardening, replacing natural coastlines (Bulleri and Chapman, 2010, Dugan et al., 2011).

Despite the increasing dominance of hardened and armored shorelines across the globe, our understanding of species assemblages on CMI, especially in regards to their environmental effects is limited (Connell and Glasby, 1999, Dugan et al., 2011). This knowledge gap severely impairs our ability to manage urbanized coastal environments (Bulleri and Chapman, 2010). The few studies that have examined marine growth on CMI such as pontoons and breakwaters found assemblages that greatly differ from those of adjacent natural habitats (e.g., Connell, 2000, Lam et al., 2009). Communities developing on CMI are typically less diverse than natural assemblages, and are commonly dominated by nuisance and invasive species (Glasby et al., 2007). This mainly results from the unique physical characteristics of CMI, predominantly, composition and design. CMI often include highly inclined, and homogeneous surfaces with minimal surface complexity, compressing the intertidal zone to a narrow belt which supports only highly tolerant species (Chapman and Underwood, 2011). Moreover, over 50% of CMI are made of Portland cement, which is known as a poor substrate in terms of biological recruitment, presumably due to high surface alkalinity (pH ~13 compared to ~8 of seawater) and presence of compounds that are toxic to marine life (Lukens and Selberg., 2004, EBM, 2004). Thus, the ability of CMI to provide ecosystem services similar to those offered by natural habitats is severely compromised, and most urban/industrial coastal environments are considered as sacrificed zones in relation to environmental activity.

In the last few years, a different approach has been emerging, utilizing principles of ecological engineering (Bergen et al., 2001) for enhancing the biological and ecological value of CMI (e.g., Li et al., 2005, Naylor, 2011). To date, enhancement measures concentrated on design or textures aspects, aiMediterranean at attracting more abundant and diverse natural assemblages (Wiecek, 2009, Goff, 2010, Dyson, 2009) yielding ecological and structural advantages. These advantages are mainly related to biogenic buildup; a natural process in which engineering species like oysters, serpulid worms, barnacles and corals deposit calcium carbonate (CaCO3) skeletons onto hard surfaces thus creating valuable habitat to various organisms (Jones et al., 1994) while also contributing to the structures' strength and stability (Risinger, 2012). Nonetheless, studies attempting to modify the composition of CMI, making it favorable to species of ecological value such as ecosystem engineers, are scarce.

The inventors of the present application provide an integrative approach targeting both composition and design. For this, a series of five innovative concrete matrices were tested aiMediterranean at enhancing natural biological assemblages, while still complying with formal requirements of marine construction. The new matrices have reduced alkalinity in comparison to Portland cement, and include various additives that decrease the dominance of Portland cement in the mix, potentially making them more hospitable to marine life. In addition, the impact of increased surface complexity, which is known to encourage biological development (Perkol-Finkel et at, 2012 and references therein), was tested and its interaction with the concrete matrix.

Detailed herein below are their results from a year-long experiment, evaluating the biological performance of the innovative concrete matrices in comparison to standard Portland cement in both tropical (Red Sea) and temperate (Mediterraneaniterranean Sea) environments. The impact of composition and complexity were experimentally evaluated using a series of long-term field experiments and controlled laboratory tests. Different concrete matrices showed different recruitment of different species assemblages (in terms of assemblages, biomass and recruitment capabilities of target species) as compared with standard Portland cement. In addition increased surface complexity yielded enhanced growth of natural biological assemblages and calcium carbonate deposition by ecosystem engineers. Results indicate that slight modifications of concrete composition and design can improve the capabilities of concrete based CMI to support enhanced marine fauna and flora and provide valuable ecosystem services. Such enhanced natural biological assemblages do not compromise the concrete's durability; on the contrary, they can provide physical protection with time, through weight addition and bio-protection.

GENERAL DESCRIPTION

The present invention provides a marine infrastructure comprising a concrete matrix having a pH of less than 12 for use in promoting fauna and flora growth in aquatic environment.

In a further aspect the present application provides a method of promoting the growth of fauna and flora in terrestrial and aquatic environments comprising providing a marine construction infrastructure composed of a concrete matrix having a pH of less than 12.

When referring to "aquatic environment" it should be understood to encompass any type of body of water including, but not limited to marine (including oceanic zones, benthic zones, intertidal zones, neritic zones, estuaries, salt marshes, coral reefs, lagoons and mangrove swamps) and freshwater (including lentic, lotic, wetlands and ponds). The term relates to any depth of said aquatic environment, at any temperature, at any time of year or condition of weather and any flow rates.

When referring to "fauna and flora" it should be understood to encompass any type of plant, organism or animal that is typical to the aquatic environmental ecosystem involved.

In some embodiments marine fauna and flora includes at least one of the following: (i) engineering species such as corals, oysters, serpulid worms, coralline algae and barnacles, that deposit a calcitic skeleton which elevates the structural complexity of the structure and create habitat for other organisms; (ii) filter feeding organisms such as oysters, mussels, tunicates and sponges that feed using filtering organs while in the process uptake nutrients and organic particles from the water; (iii) endolithic/epilithic blue-green algae, and in certain cases when concrete surface is above water level also lichens, fungi and mosses.

When referring to "promotion of fauna and flora growth" it should be understood to encompass any qualitative or quantitative promotion, enhancement, reinforcement, fortification, strengthening, support, recruitment or support of the stability, growth, health and proliferation of fauna and flora either already growing or is capable of growing in aquatic environmental ecosystem, measurable by any parameter known in the art (number of individuals or species, life cycle, coverage of growth or a surface, etc).

In some embodiments said promotion of marine fauna and flora facilitates deposition of inorganic matter on the surface of said structure can reach values between about 50 to 1000 $gr/m^2$ after 12 months at a depth range of 1-10 meters. While chlorophyll concentration on the surface of said structure can reach values between about 100 to 800 $\mu gr/m^2$ after 12 months at a depth range of 1-10 meters.

In other embodiments said promotion of marine fauna and flora provides coral recruits on the surface of said structure is between about 5 to 25 recruits per 15×15 surface area after 12 months at a depth range of 1-10 meters, and coral settlement rates under laboratory conditions on the surface of said structure is between about 5 to 60% after <1 month.

The term "marine construction infrastructure" should be understood to encompass any type, shape or size of an infrastructure that is defined to be suitable for marine construction including coastal defense structures such as breakwaters, seawalls, revetments and groins, bulkheads, piers, berths, and related infrastructures such as ports, marinas, waterfronts, promanades etc. (see also Army corps—SHORE PROTECTION MANUAL in http://ia600208.us.archive.org/14/items/shoreprotectionm01unit/shoreprotectionm01unit.pdf). Examples of such marine construction infrastructure includes, but is not limited to enhanced sea walls, armoring units, tide pools, piles, bridge bases, seaward berms, concrete mattress, under water cables and pipes casing, mooring units.

The term "concrete matrix" refers to a concrete composition typically comprising at least one type of cement (such as for example Portland cement or Calcium aluminate cements), at least one aggregate (such as for example lime stone, blue stone), sand (fine graded aggregate less 4.75 mm and or natural or crashed aggregate less 0-2 mm) and water (potable, and shall not contain more than 1000 parts per million of chlorides or sulfates, free from harmful substances such as lead, copper, zinc (<5 ppm) or phosphates (<5 ppm)).

In a further aspect the invention provides a method of promoting the growth of endolitic and epilitic flora comprising providing an infrastructure composed of a concrete matrix having a surface pH of less than 12. It is to be noted that such infrastructure may also be terMediterranean bioactive terrestrial structure (i.e. bioactive structure above the water level, however with sufficient humidity and precipitates to promote the growth of terrestrial flora as in natural systems.

The term "endolitic and epilitic flora" should be understood to encompass lichens, fungi, mosses, as well as blue-green algae.

It is to be noted that such endolitic and epilitic flora can be grown in land environments—with sufficient humidity and precipitates.

In some embodiments, such infrastructure mentioned herein above is a "bioactive wall" element that is designed to induce rapid plant wall coverage of inland buildings. Green plant coverage significantly improves urban landscape, provides cleaner and healthier air, and reduces the ecological footprint of urban development. The physical and chemical properties of the wall substrates strongly influence its capability to support and enhance growth. In some embodiments such bioactive wall structure induces natural growth of wall clinging plants, endolithic algae, lichens and mosses. In some further embodiments said bioactive wall structure has high complexity and porosity that allows creating moist niches that support flora, without the need for complex soil systems.

In another one of its aspect the invention provides a method of promoting the growth of endolitic and epilitic anaerobic and aerobic flora and fauna comprising providing a structure composed of a concrete matrix having a pH of less than 12.

In some embodiments said structure mentioned herein above is a "live rock" structure, i.e. a structure according to the invention placed in separated closed marine environments, such as for example aquarium (such as salt water aquarium). Such live rock structures confer to the closed marine environments multiple benefits desired by the saltwater aquarium hobbyist. A live rock structure of the invention provides superior biological filter that hosts both aerobic and anaerobic nitrifying bacteria required for the nitrogen cycle that processes waste. Thus, said live rock becomes the main biological nitrification base or biological filter of a saltwater aquarium. Additionally, a live rock structure of the invention may also have a stabilizing effect on the water chemistry, in particular on helping to maintain constant pH by release of calcium carbonate. Further a live rock structure is a decorative element of the aquarium and provides shelter for the inhabitants.

It is to be noted that promoting the growth of endolitic and epilitic anaerobic and aerobic flora and fauna, such as for example *nitrobacter* and *nitrosomans*.

In some embodiments said concrete matrix has a pH of less than about 11. In other embodiments said concrete matrix has a pH of between about 9 to about 10.5.

In some embodiments, said pH of said concrete matrix is the pH of substantially the entire concrete infrastructure. In other embodiments said pH of said concrete matrix is the pH of substantially the top surface of said infrastructure. In yet further embodiments the thickness of said top surface is about 5 cm or more.

In some embodiments the salinity of said aquatic environment is between about 0 to 45 ppt (i.e. salinity can be 0, 1, 2, 3, 4, 5, 10, 15, 20, 25, 30, 35, 40, 45 ppt).

Enhancement of flora and fauna relates to aquatic environments in areas exposed to sufficient light, i.e., within the photic zone (0-100 meters depth maximum) and in areas from the seabed and up to the splash zone, or above for Bioactive structures that support terrestrial flora.

In some embodiments, said infrastructure has a surface roughness having a roughness grade of at least 12. In other embodiments, said infrastructure has an RA value of at least 50 microns. In addition, said infrastructure has a surface texture with an RA value of at 5-20 mm.

In some other embodiments said concrete matrix has a weight per volume of between about 1100 to about 2500 Kg/m$^3$. In yet further embodiments said concrete matrix has a weight per volume of between about 1100 to about 1800 Kg/m$^3$.

In further embodiments said concrete matrix comprises with additives and cements in weight between 0 to about 90% of the Portland cement weight or completely replacing it.

In other embodiments said concrete matrix comprises at least one of microsilica/silica fume and metakaolin and Calcium aluminate cements. In some embodiments above noted silica and/or metakaolin and/or calcium alumina cement is added to concrete matrix to replace any equivalent weight % amount of Portland cement in the matrix.

In some further embodiments said concrete matrix has average compressive strength of between about 30 to 80 Mpa (i.e. about 30, 35, 40, 45, 50, 55, 60, 65, 70, 75 or 80 Mpa). (ASTM C 39 (AASHTO T 22))

In some further embodiments said concrete matrix has water pressure penetration resistance of between about 5 to 50 mm under the pressure of 7 bar (i.e. about 5, 10, 15, 20, 25, 30, 35, 40, 45, 50 mm) (EN 12390-8)

In other embodiments said concrete matrix has chloride penetration resistance of between about 500 to 2000 Coulombs (i.e. about 500, 600, 700, 800, 900, 1000, 1100, 1200, 1300, 1400, 1500, 1600, 1700, 1800, 1900, 2000 Coulombs. (ASTM c 1202)

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3A provides live cover at the Red Sea (denoted Red). FIG. 3B provides live cover at the Mediterranean Sea (denoted Med). Solid line represents Smooth tile face (denoted S) while dotted line represents the Textured face (denoted T).

FIG. 4A shows the textured face fully with 100% cover. FIG. 4B shows the smooth face of the same tile with limited recruitment. FIG. 4C shows the 2D-MDS of community data. Each point represents one tile face (Textured face=square, Smooth face=circle). Example from tiles at the Red Sea, 6 months post deployment showing separation between textured (up) and smooth (down) tile face.

FIG. 5A shows the comparison at the Red Sea (denoted Red). FIG. 5B shows the comparison at the Mediterranean Sea (denoted Med).

FIG. 7A shows recruits of soft corals. FIG. 7B shows recruits of stony corals.

DETAILED DESCRIPTION OF EMBODIMENTS

Materials and Methods

Field Experiment

Figure 1:
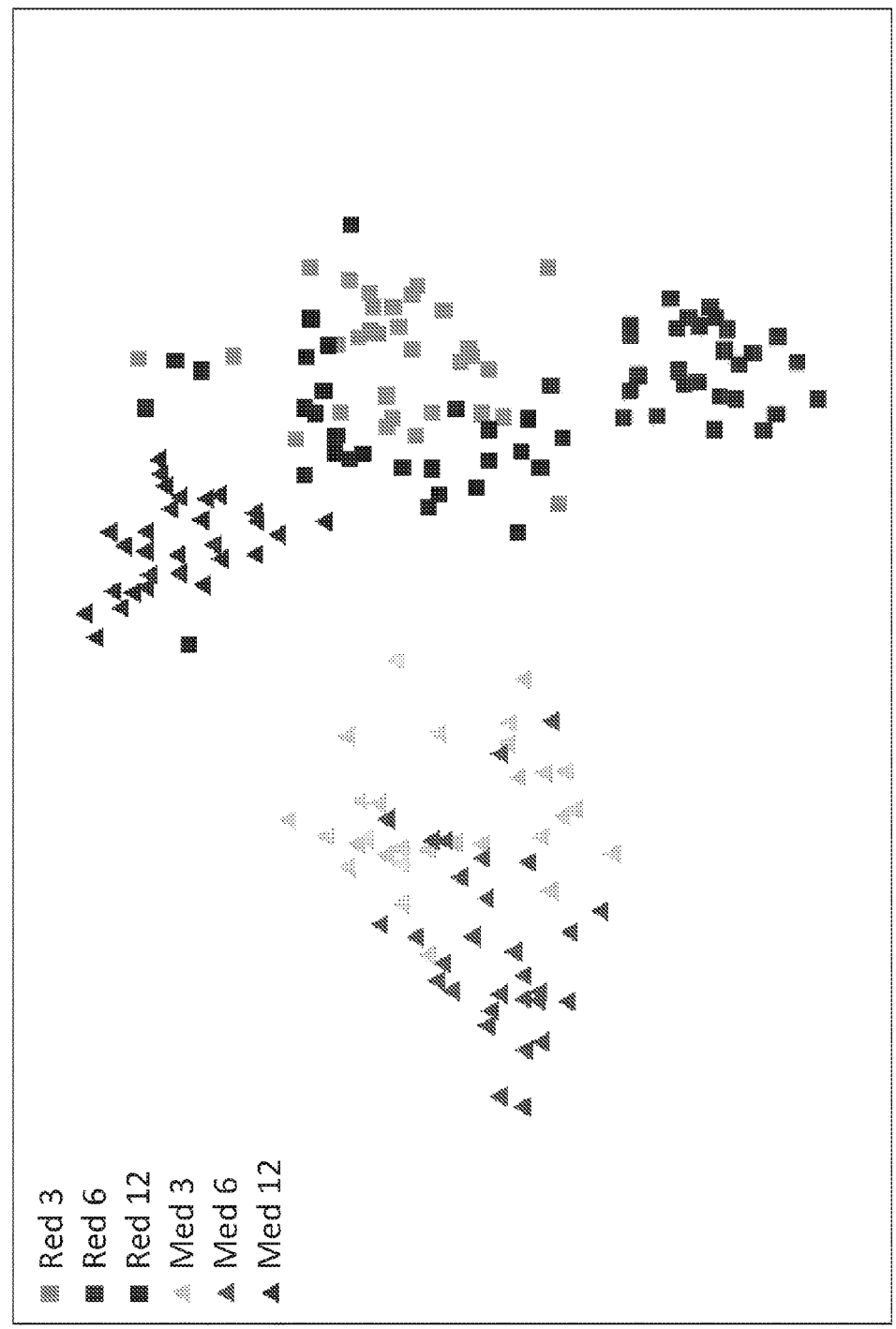
FIG. 1 depicts the 2D-MDS of community data from the two field stations (Red Sea=squares; Mediterranean Sea=triangles) corresponding to 3 months (denoted Red3, Med3 respectively), 6 months (denoted Red6, Med6 respectively) and 12 months (denoted Red12, Med12 respectively) post deployment. Each point represents one tile (tile faces pooled).

The recruitment capabilities (in terms of both flora and fauna) of five different concrete matrices were tested in comparison to standard Portland cement. All matrices tested withstand compressive forces of 30-50 MPa, complying with the different requirements for marine construction (see section "Preparation of Concrete Matrices"). Apart from testing the effect of concrete composition on recruitment, the effect of surface texture, i.e., smooth vs. textured surface, on recruitment of marine flora and fauna was tested. Recruitment was tested simultaneously in the tropical environment of the Red Sea, at the Inter University Institute in Eilat, and in the temperate waters of the Mediterraneaniterranean Sea near Ashdod, Israel.

15×15×4 cm concrete tiles were used for the field experiment. Each tile, weighing ca. 2.5 kg, had one smooth face and one textured. Texture was for Mediterranean using a plastic form-liner, creating a coral polyp-like texture. Ten replicates were prepared for each of the 5 tested matrices (M1-M5) and of the Portland control. Each tile was tagged with an ID number (1, 2, 3 . . . ) that does not reveal the matrix composition. Matrix type for each tile number was listed separately, allowing "blind" sampling (i.e., surveyors sampled tiles without knowing their concrete composition), eliminating byes data collection. The tiles were mounted onto a metal mesh table deployed at sea. At the Red Sea station tiles were placed at 10 m depth, while in the Mediterranean Sea station, due to shallower seabed conditions, at 6 m depth. Tiles of the various matrices were laid randomly on the mesh table, with the textured face oriented seaward.

Five tiles of each matrix were sampled 3, 6 and 12 months post deployment. In each monitoring event, tiles were temporarily retrieved from the sea and transferred fully submerged to the laboratory. Both faces of each tile were carefully inspected using a dissecting microscope, photographed, and sampled before re-deployed. Quantification of the cover of recruited taxa on each tile face was perforMediterranean using a 1×1 cm grid, according to Perkol-Finkel et al. (2008). Data noted included taxa composition, percent cover of colonial organisms (bryozoans, tunicates and sponges), and number of solitary organisms (tunicates, bivalves and barnacles). Taxonomic groups that could not be counted as individuals (i.e., clusters of serpulid worms), or ones differing in density (turf and coralline algae), were ranked as follows: 0—absent, 1—sparsely scattered, 2-densely scattered and 3—densely uniform.

In addition, during the 6 and 12 months post deployment monitoring, chlorophyll concentration and biomass (organic and inorganic dry weight) were measured, by carefully scraping all benthic organisms and algae from one quarter of the smooth face of each tile following Perkol-Finkel et al. (2006). An additional quarter of each smooth face was sampled for chlorophyll content analysis following Greenberg (1995).

Data analysis included univariate 1-way PERMONOVA tests, based on Euclidian Distances similarity index, for organic and inorganic biomass, chlorophyll concentration, and percent live cover, as well as multivariate data analyses of taxa assemblages by a-parametric PERMANOVA tests based on the Bray-Curtis similarity index. In addition, post-hoc pair wise tests were applied when relevant. 2D-MDS plots were used to graphically represent trends in multivariate data. All analyses were perforMediterranean using the PRIMER/PERMANOVA programs (Anderson et al., 2008, Clarke and Gorley, 2006). Data in figures are presented as average±SE unless mentioned differently.

Lab Experiments

In order to quantify the recruitment-enhancing capabilities of the five different concrete matrices in comparison that of standard Portland cement, in-vitro lab experiments were conducted. These included two soft coral species; *Heteroxenia fuscescens* and *Dendronephthya hemprichi*, as well as larvae of the filter feeding Bryozoan *Bugula neritina*. Larvae collection of *H. fuscescens* and *B. neritina* was conducted by incubation of colonies in the laboratory, while for *D. hemprichi* minute fragments were prepared manually from adult colonies using seizers. Settlement of larvae/fragments was monitored 1 week after initiation of the experiment, except for settlement of *H. fuscescens* which was examined a month after initiation of the experiment due to its slower settlement process. During monitoring the number of larvae/fragments settled on each cube was determined.

Test units consisted of 2.5×2.5×2.5 cm concrete cubes corresponding to the five matrices tested in the field (MI-M5) in comparison to Portland cement controls. During each experiment, 5-8 replicates of each matrix (depending on larvae availability) were tested. For this, each concrete cube was placed in an individual 250 ml beaker filled with fresh running seawater and left for 3 days for acclimatization. After acclimatization, a uniform number of larvae were added to each beaker. The number of larvae introduced to each beaker varied according to larvae availability, ranging from a minimum of 5 per beaker to a maximum of 40 larvae per beaker. Water temperature was kept similar to that of natural conditions. Beakers were placed fully submerged in a running water table with good circulation. If mobile larvae were examined, beakers were submerged in the running water system up to ¾th of their height until initial larval settlement (typically, 24-72 h) after which they were fully submerged.

Data analysis included univariate 1-way PERMONOVA tests, based on Euclidian Distances similarity index, and post-hoc pair wise tests, using the PRIMER/PERMANOVA programs (Anderson et al., 2008, Clarke and Gorley, 2006).

Preparations of Concrete Matrices

The matrices tested in this study varied in the amount of Portland cement in the mix, use of other cements, air content, and add-mixer. Crack prevention 25 mm microfibers were included in all matrices. Matrices were mixed by an 80 liter horizontal mixer and were cast into 10×60×160 cm forms with plastic form liners. After 28 days, the concrete sheets were cut by a water jet marble sow into 15×15 cm experimental tiles. As form liner was applied only to one at the bottom face of the form, each tile had one textured and one smooth face.

All matrices were tested according to ASTM or EN standards, including: Compression Strength—ASTM C 39 (AASHTO T 22), Water Pressure Penetration Resistance—EN 12390-8, Chloride Ion penetration Resistance—ASTM C1202-12. Concrete pH values were checked by collecting 5 gr of drilled residue from 0.5 cm deep drilled holes on the concrete surface and mixing them in 50 ml of distilled water (pH 7). All tested concrete matrices (MI-M5) showed lower pH values than the Portland cement based mix (9-10.5 compared to 12.5-13.5 respectively, Table 1). In terms of compressive strength, M1-M5 had similar or greater strength as that of Portland cement based mix, with values reaching as much as 39.3 MPa (M2). All matrices except for M4 and M5, which had high air content, presented higher chloride ion penetration resistance (<1500 coulombs) than the Portland cement based mix with similar density (2300-2500 kg/m$^3$), and water pressure penetration resistance (<20 mm)

TABLE 1

Physical parameters of the various innovative concrete matrices in comparison to Portland cement.

| Matrix | Water/Cement Ratio | pH | Average Compression Strength (Mpa) | Weight (Kg/m$^3$) | Water Pressure Penetration Resistance (mm) | Chloride Penetration Resistance (Coulombs) |
|---|---|---|---|---|---|---|
| M1 | 0.3 | 9-10 | 32.5 | 2300-2500 | <20 | <1500 |
| M2 | 0.3 | 9.5-10.5 | 48.5 | 2300-2500 | <20 | <1000 |
| M3 | 0.3 | 9.5-10.5 | 39.3 | 2300-2500 | <20 | <1000 |
| M4 | 0.3 | 9-10 | 31.1 | 1400-1800 | NR | NR |
| M5 | 0.3 | 9-10 | 31.9 | 1400-1800 | NR | NR |
| Portland | 0.30-0.25 | 12.5-13.5 | 32 | 2300-2500 | <20 | >2000 |

NR - Not relevant for high air content concrete

Results

Field Experiment

Statistical analyses of community data revealed significant differences in species assemblages between sites (Red vs. Mediterranean Sea: df=1, pseudo f=177.47, P=0.001), months post deployment (3, 6, 12 m: df=2, pseudo f=83.38, P=0.001), matrix types (M1-M5, Portland: df=5, pseudo f=2.45, P=0.001) and plate face (smooth vs. textured: df=1, pseudo f=11.12, P=0.001). FIG. 1 illustrates the different community structure of the Red and Mediterranean Sea stations, as well as clear temporal patterns indicating that community structure gains similarity with time, as indicated by the relative proximity of 12 months post deployment clusters (dark shades) in comparison to those of 3 and 6 months (lighter shades) which appear farther apart on the MDS.

Figure 2:
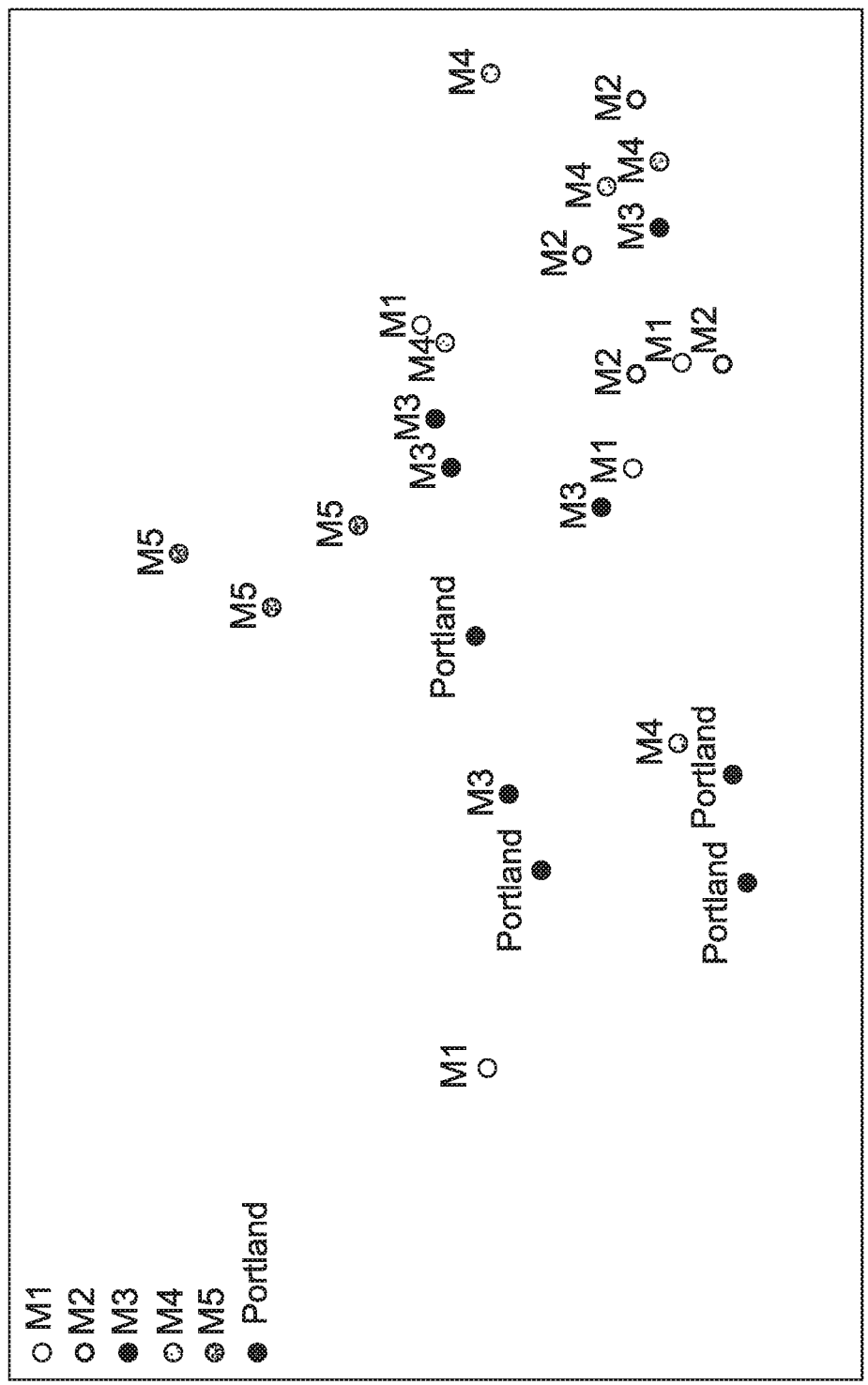
FIG. 2 depicts the 2D-MDS of typical community data. Each point represents one tile (faces pooled). Example from Red Sea, 6 month post deployment, showing the various concrete matrices of the invention (denoted M1, M2, M3, M4, M5 respectively) at the right side of the plot, while Portland cement tiles clustered at the left.

The taxa composition recruited to the different concrete matrices also varied among sites and with time (significant Site×Matrix interaction term: df=5, pseudo f=1.50, P=0.049 and Month×Matrix: df=10, pseudo f=1.37, P=0.037). Yet the general trend indicated that tiles composed of Portland cement clustered separately from the other concrete matrices (MI-5), as seen in FIG. 2. The level of similarity amongst the various matrices varied with time and between sites.

Figure 3A:
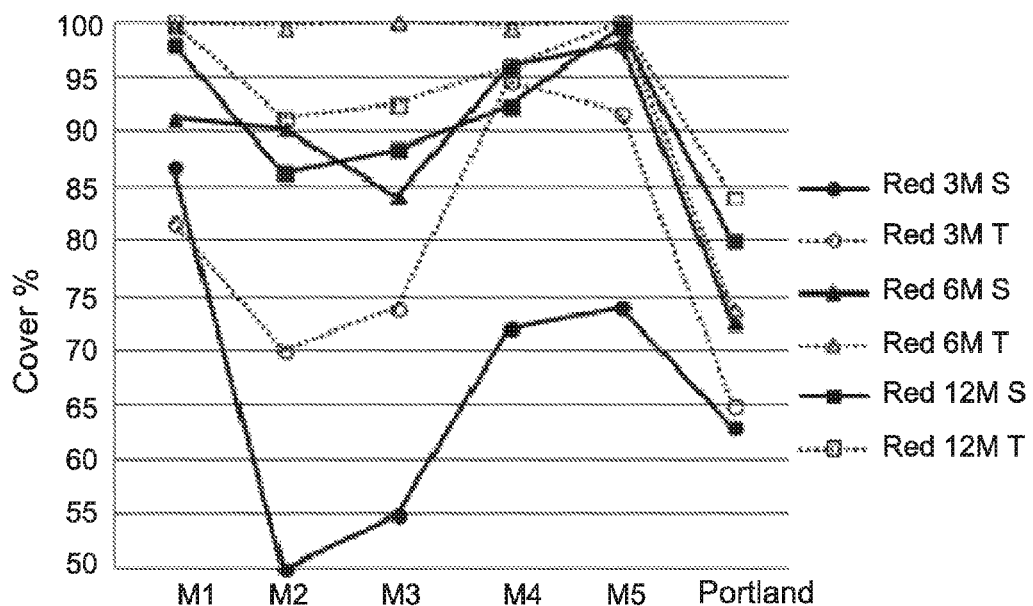
FIGS. 3A-3B provides a schematic comparison of percent live cover 3, 6 and 12 months post deployment (denoted as 3M, 6M and 12M respectively) on various innovative concrete matrices of the invention (denoted as M1, M2, M3, M4 and M5 respectively) in comparison to Portland cement.
Figure 3B:
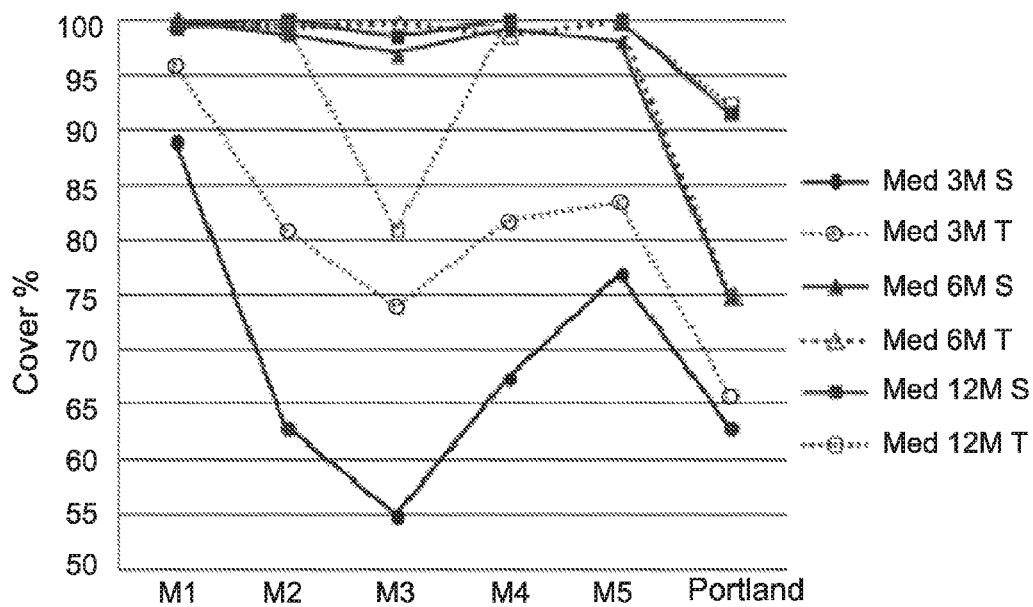

Analyses of percent live cover (FIG. 3) supported the results of the multivariate community data analyses, revealing that live cover differed between sites (df=1, pseudo f=6.77, P=0.009), months (df=2, pseudo f=133.36, P=0.001), Tile Face (df=1, pseudo f=20.58, P=0.001) and Matrices (df=5, pseudo f=27.57, P=0.001). The trend in percent cover of the various matrices was consistent among sites, but did change with time and in relation to tile face (significant interaction terms: Month×Matrix, df=10, pseudo f=4.64, P=0.001 and Month×Face, df=2, pseudo f=9.00, P=0.001). Pair-wise comparisons show that as early as 3 months post deployment, Portland cement tiles had lower live cover compared to the other matrices, mainly, MI, M4 and M5 who recruited the highest percent live cover.

Figure 4A:
FIGS. 4A-4C shows the typical recruitment of benthic organisms onto concrete matrices of the invention (example from M4, 6 months post deployment at the Red Sea).
Figure 4B:
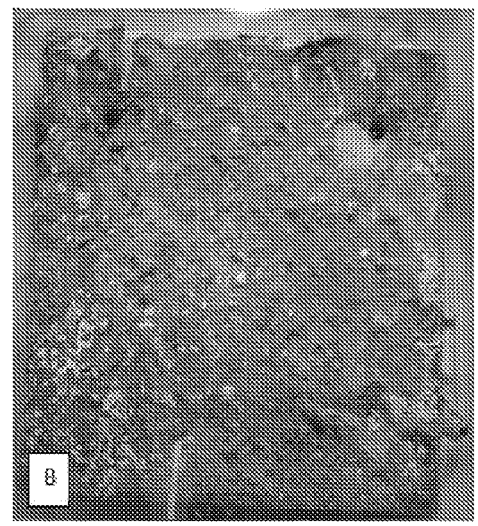
Figure 4C:
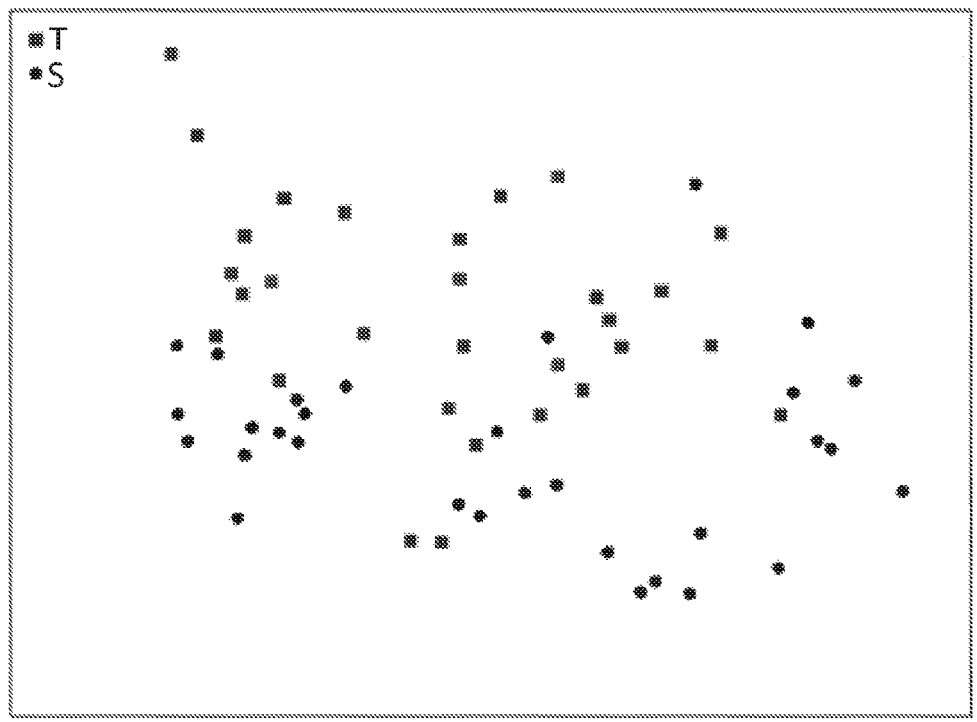

When examining trends related to tile surface complexity, it is evident that while in the Red Sea station differences between smooth and textured tile face were consistent with time, in the Mediterranean Sea station, difference between plate faces was significant initially (3M post deployment), yet non-significant 6 and 12 months post deployment. These results are in agreement with the multivariate community data analyses from the red sea, clearly indicating that overall, complex surface texture, as opposed to smooth, recruited more diverse and dense benthic assemblage (FIG. 4).

Figure 5A:
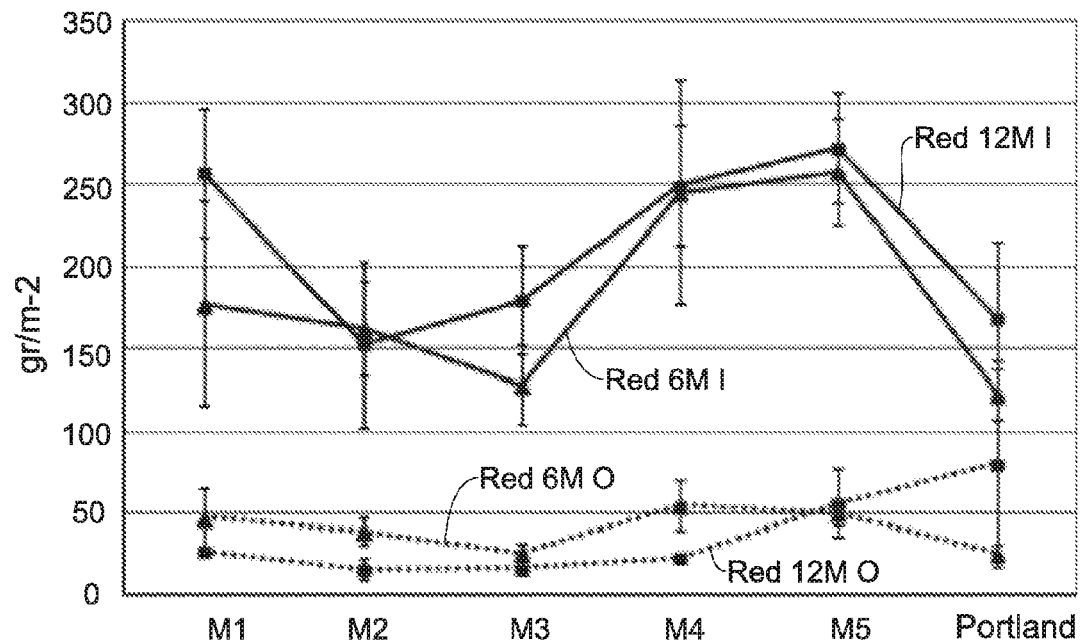
FIGS. 5A-5B provides a schematic comparison of organic (dotted line, denoted O) and inorganic (solid line, denoted I) biomass accumulated on concrete matrices of the invention (denoted M1, M2, M3, M4 and M5 respectively) in comparison to Portland cement, 6 and 12 months post deployment (denoted 6M and 12M respectively).
Figure 5B:
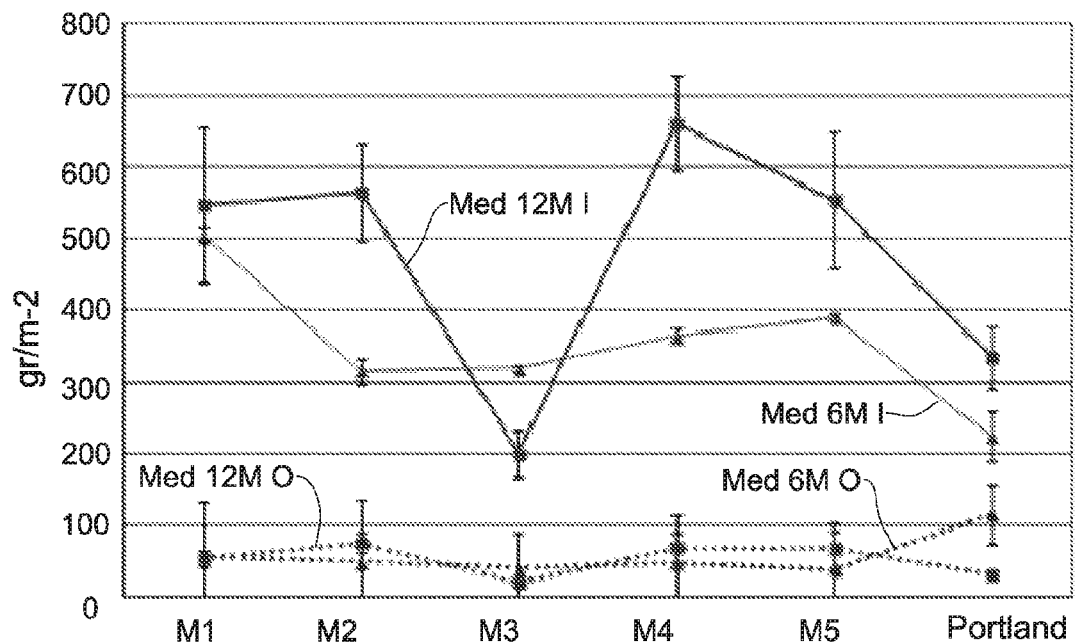

Differences in the recruitment capabilities of the various innovative concrete matrices in comparison to Portland cement tiles were highly evident from the biomass analyses conducted 6 and 12 months post deployment, specifically, in relation to inorganic material (FIG. 5). While the amount of organic matter recruited onto the tiles differed among sites (df=1, pseudo f=4.93, P=0.029), no significant trend appeared in relation to months post deployment or between the various Matrices. Nonetheless, concentrations of inorganic matter significantly differed between sites (df=1, pseudo f=83.53, P=0.001), months (df=1, pseudo f=11.16, P=0.002) and Matrices (df=5, pseudo f=7.28, P=0.001). These difference changed with time between sites (significant Site×Month interaction: df=1, pseudo f=4.23, P=0.039), and pair-wise comparisons indicated that in the Red Sea station M5 and M4 were the ones driving the differences between Matrices, with highest values in comparison to other matrices, while in the Mediterranean Sea station M1, M4 and M5 had highest values on inorganic matter compared to the rest of the matrices.

The amount of inorganic material recruited onto test tiles in the Mediterranean Sea was consistently higher than that recruited in the Red Sea. Nonetheless, values were generally high in both stations with an average of 413.51±25.63 $gr/m^{-2}$ at the Mediterranean Sea station and 201.14±10.28 at the Red Sea station. A year after submersion, similar matrices exhibited greatest accumulation of inorganic material in both the Red and Mediterranean Sea stations, being M1, M4 and M5 with values at the Mediterranean Sea of 547±107.58, 659.51±65.844 and 553.95±94.94 $gr/m^2$ respectively, and 272.31±33.84, 249.79±37.00 and 257.03±39.34 $gr/m^2$ at the Red Sea.

Figure 6:
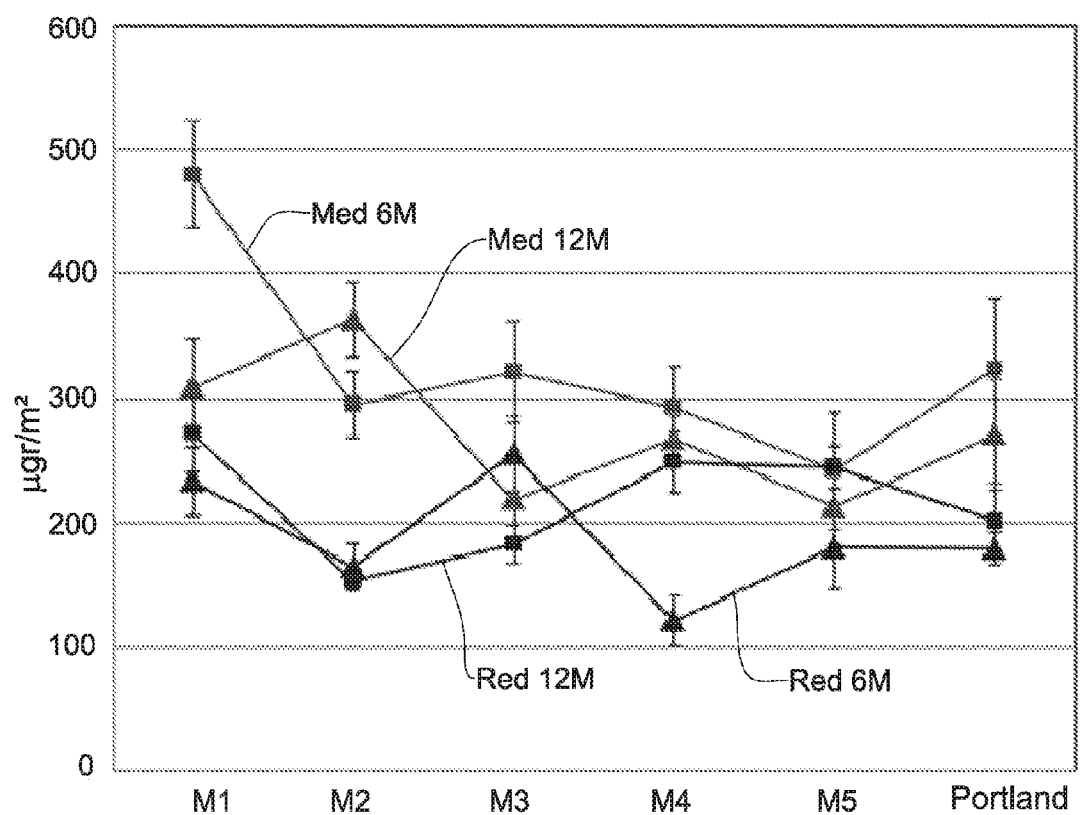
FIG. 6 provides a schematic comparison of Chlorophyll a concentrations on concrete matrices of the invention (denoted M1, M2, M3, M4 and M5 respectively) in comparison to Portland cement, 6 months (denoted 6M) and 12 months (denoted 12M) post deployment at the Mediterranean Sea (denoted Med) and Red Sea (denoted Red) stations.

Chlorophyll a content also differed significantly among sites (df=1, pseudo f=52.62, P=0.001), months post deployment (df=1, pseudo f=9.09, P=0.001) and matrices (df=5, pseudo f=4.86, P=0.001). While in most cases chlorophyll a concentrations varied between months and matrices at the two study stations (significant Site×Months×Matrix interaction term: df=5, pseudo f=2.84, P=0.015), as can be seen in FIG. 6, one trend was consistent in both stations, where Chlorophyll a concentrations of M1 tiles were significantly higher than those of Portland cement tiles (P<0.05 at both stations).

Figure 7A:
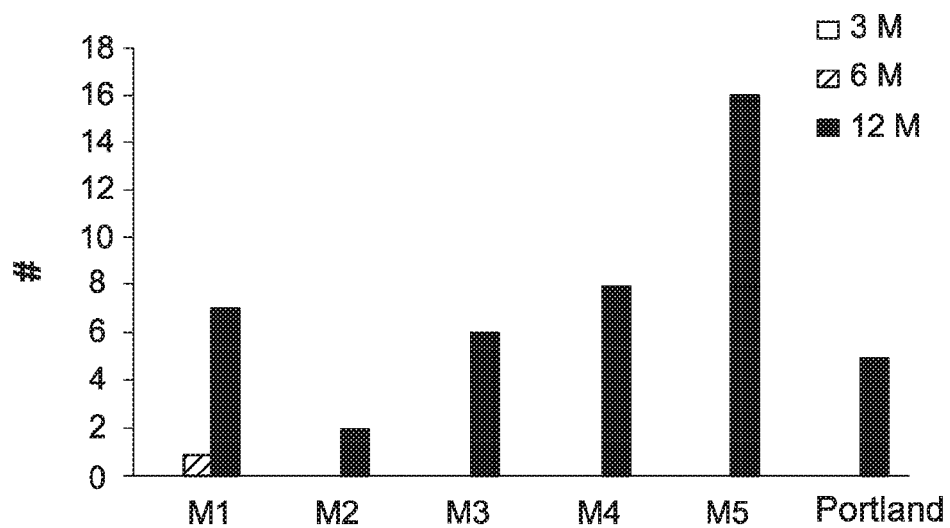
FIGS. 7A-7B provides a schematic comparison of coral recruits onto concrete matrices of the invention (denoted M1, M2, M3, M4 and M5 respectively) in comparison to Portland cement after 3 months (denoted 3M), 6 months (denoted 6M) and 12 months (denoted 12M) post deployment. Values represent total number of recruits per concrete matrix (tiles and tile faces pooled).
Figure 7B:
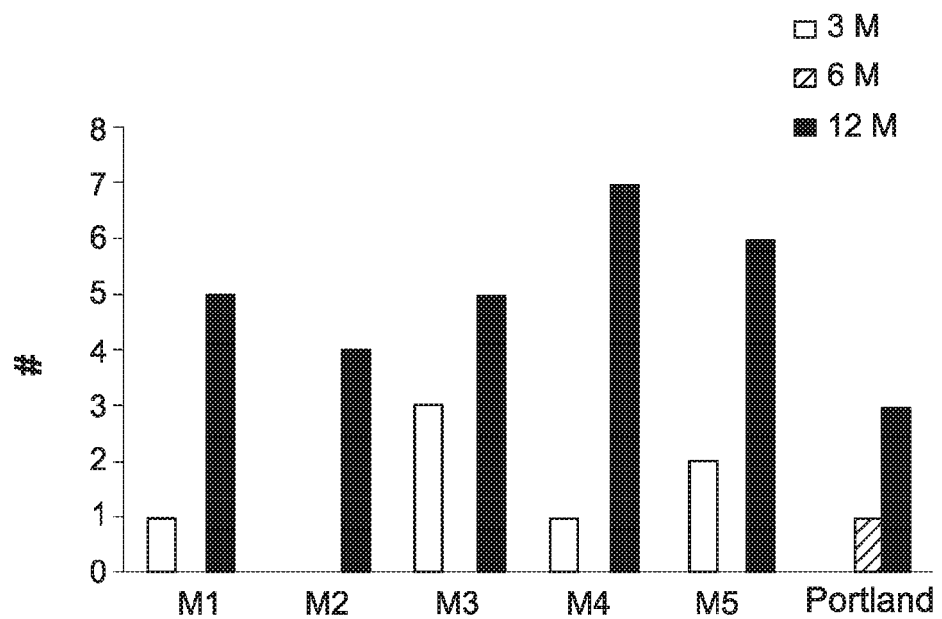

Coral recruitment, which was only found in the tropical Red Sea environment, was generally low during the first 6 months post deployment and greatly increasing in the last monitoring (FIG. 7). After a year, significant differences in recruitment capabilities were identified between the various matrices, resulting mainly from results of soft coral recruitment (df=5, pseudo f=3.74 P=0.015). Pair-wise analyses of soft coral data show that M5 and M1 had significantly higher recruitment than Portland cement tiles, regardless of place face.

Lab Experiments

Figure 8A:
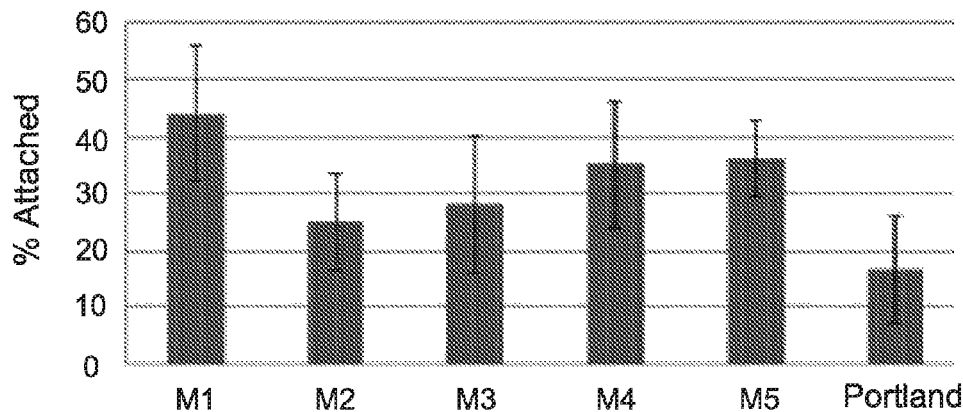
FIGS. 8A-8C provides a schematic comparison of natural attachment of *D. hemprichi* fragments (FIG. 8A), settlement of *H. fuscescens* larvae (FIG. 8B), and settlement of *B. neritina* larvae (FIG. 8C) onto concrete matrices of the invention (denoted M1, M2, M3, M4 and M5 respectively) in comparison to Portland cement.
Figure 8B:
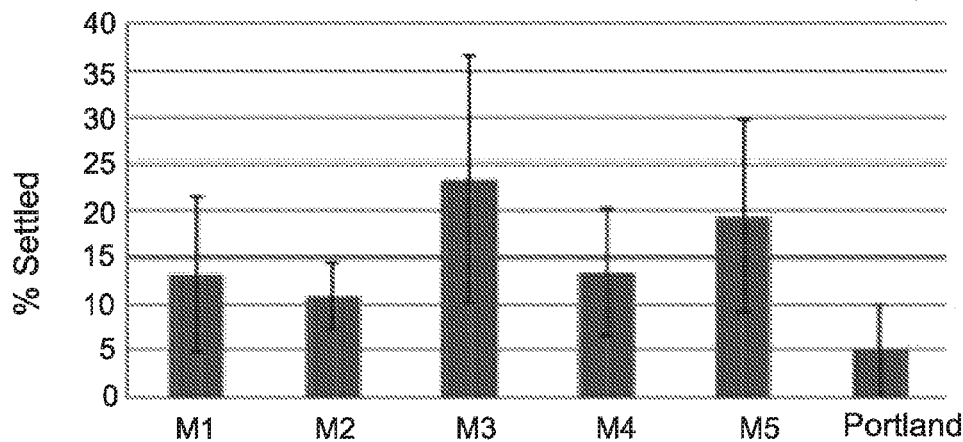
Figure 8C:
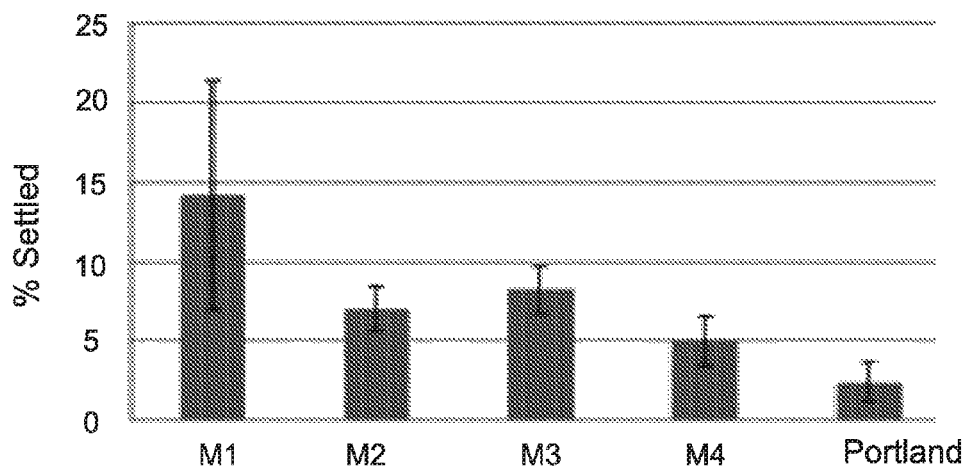

Natural attachment of *D. hemprichi* fragments was significantly different between the various matrices (FIG. 8A, df=5, pseudo f=2.75 P=0.042), where Portland cement had lowest attachment rates (16±9.42% attachment), while M1 and M5 had the highest attachment rates (44±11.86% and 36±6.69% respectively). A similar yet non-significant trend was also evident from the experiment with *H. fuscescens* larvae (FIG. 8C). Although Portland showed lowest average than the ecologically active matrices, due to high variability in the results this was not supported by the statistical test. Nonetheless, pair-wide comparisons did find a marginally significant difference between M5 and Portland cement (P=0.067). The experiment with *B. neritina* larvae however did yield significant results (FIG. 8C, df=4, pseudo f=4.05 P=0.009), where Portland cement had lowest settlement rates (2.35±1.25% attachment), while M1 and the highest recruitment rates (14.14±7.20%). Note that M5 results were not included here as due to a technical error M5 was not included in the experiment.

Discussion

With global predictions of increased growth in coastal populations, the trends of coastal hardening and expansion of coastal cities is expected to further increase. Moreover, in light of processes related to global climate change, coastlines are facing growing threats related to sea-level rise and increased storminess (Dugan et al., 2011 and references therein), calling for imMediterraneaniate revision of current coastal defense measures. This work examines an innovative approach of applying slight modifications to the composition and surface texture of concrete, aiMediterranean at facilitating marine grow and encouraging enhanced biogenic buildup. Three of the five matrices tested (MI, M4 and M5) were found to be ecologically active, exhibiting enhanced recruitment capabilities in comparison to standard Portland cement. This was evident from most of the biological parameters examined in the lab and at the field, at both sampling stations. Overall, these ecologically active matrices recruited greater live cover (FIG. 1), more inorganic matter (FIG. 5), and had higher settlement rates of corals and target organisms (FIGS. 7-8) than the standard Portland cement based mix. Enhanced recruitment capabilities of natural assemblages of marine flora and fauna onto concrete based CMI yields valuable structural, environmental and socio-economic advantages.

In terms of structural advantages, as CMI are often used for coastal defense (e.g., breakwaters and seawalls), weight and stability plays a major role in structural performance. In this study, ecologically active concrete matrices accumulated significantly more inorganic matter than Portland cement. Biogenic buildup of ecosystem engineers like oysters, serpulid worms, barnacles and corals, increases the structures' weight, contributing to its stability and strength (Risinger, 2012). According our results, an average of 413 (Mediterranean Sea)–201 (Red Sea) $gr/m^2$ can be added to ecologically active concrete surfaces within a 12 m period, reaching maximal values of 1 $kg/m^2$ in the Mediterranean Sea and nearly 0.5 $kg/m^2$ in the Red Sea.

Figure 9:
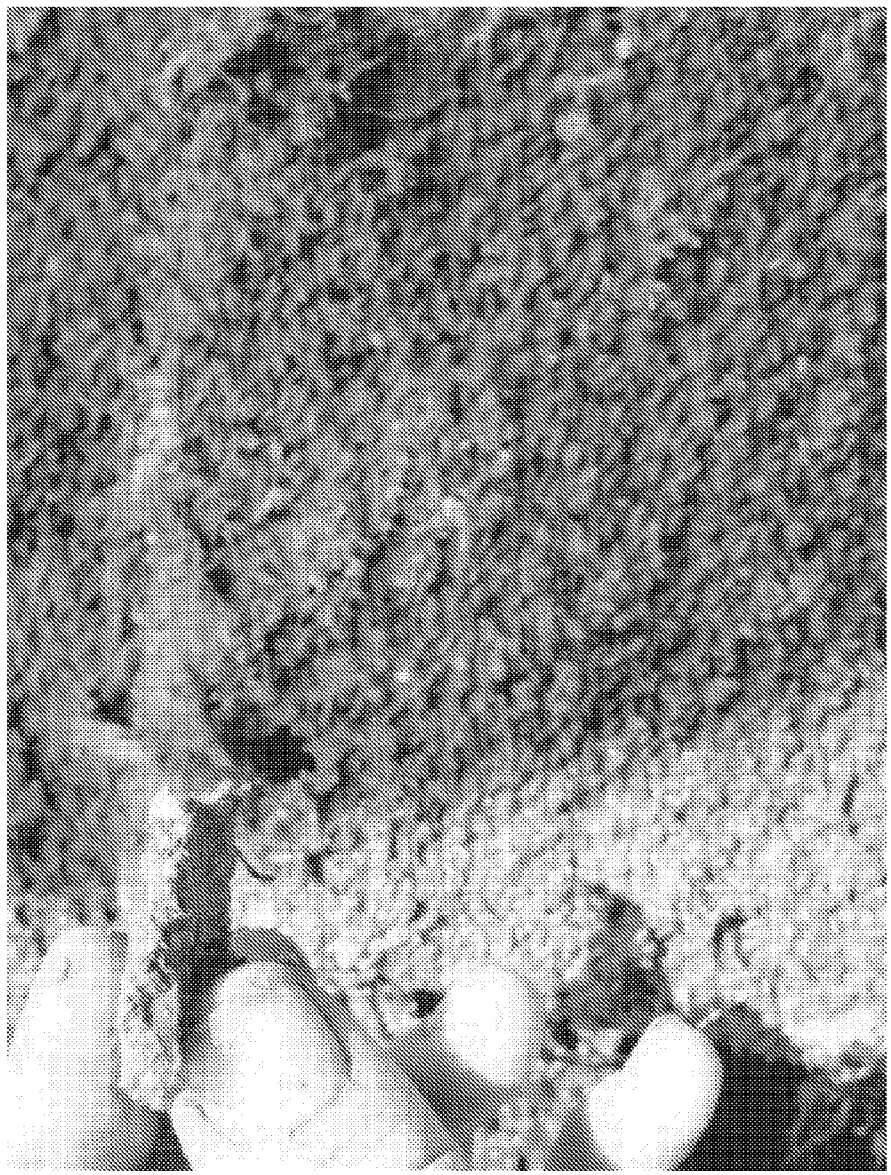
FIG. 9 depicts the scrapped material composed of calcitic biogenic growth accumulated onto concrete matrix of the invention denoted M4 tile, FIG. 3 month post deployment.

While there are cases where growth of marine organisms, mainly burrowing sponges or certain species of green algae, can deteriorate concrete surfaces (Jayakumar and Saravanane, 2010, Scott et al., 1988), our results indicated of beneficial bio-protective effects. In addition to contributing to the overall weight of CMI, biogenic growth of coralline algae, oysters, corals and serpulid worms can strengthen concrete surface. For example, Risinger (2012) who examined the influence of oyster growth on concrete strength found that concrete covered with marine growth showed a significant ten-fold increase in flexural strength over a two years period. Apart from weight addition, biogenic buildup also increases the bond between adjacent infrastructure elements (armoring units, seawall precast elements, etc.), as marine growth acts as biogenic glue that can help absorb wave energy and reduce surge impact of the structure. Such biogenic buildup, which with time can cover the surface with a calcitic layer (FIG. 9), also adds to the durability of the structure by absorbing hydrodynamic forces and protecting the concrete from chloride attacks and chipping.

Although such intense growth might disrupt visual surveys of the infrastructures' state, inspection can be achieved by scraping off sections of the growth at random (typically, no more than 10% of the surface), which will re-grow with time. In light of the above, application of ecologically active concrete matrices in CMI can help make them more sustainable, and in the long term might reduce the need and cost of maintenance work.

Apart from structural advantages, ecologically active concrete matrices are also associated with substantial environmental benefits. As evident from the results, matrices that have proved ecologically active had significantly higher live cover than standard Portland cement (average cover of MI, M4 and M5 tiles was nearly 100% in both stations 12 months post deployment, while Portland tiles averaged 82%-92%). Much of the live cover consisted of ecosystem engineers that contribute to biogenic buildup (oysters, corals, barnacles and serpulid worms) on one hand, and filter feeding organisms that can elevate water quality and clarity on the other (e.g., tunicates, sponges, oysters and mussels). Moreover, as evident from both the in-situ and in vitro settlement experiments, corals and other typical intertidal organisms such as B. neritina showed clear preference to ecologically active matrices, predominantly M1 and M5. Creating CMI with enhanced ability to recruit corals and species that provide valuable ecosystem services such as filter feeders and biogenic builders is of great ecological importance. By enhancing the biological productivity and ecological value of CMI, their ecological footprint can be reduced and utilized as urban nature zones, instead of viewing them as scarified "urbanized-industrial deserts".

Another environmental advantage of some of the innovative concrete matrices tested is reduced carbon footprint. As matrices include various additives that can significantly reduce the amount of Portland cement in the mix, which is known for its high carbon footprint (Matthews et al., 2008), such matrices can be considered more ecological. For example, M2 and M3 did not perform much differently from standard Portland cement under the given time frame, yet as they have a reduced carbon footprint, they can still be considered more ecological than standard concrete mixes. Nonetheless, evaluating the carbon footprint of the various concrete matrices was not the scope of the current research and requires further investigation.

Finally, as CMI are an integral part of waterfronts throughout the globe, their socio-economic implications cannot be ignored. Nowadays, when environmental awareness is in constant rise, environmental agencies are calling for ecological compensation (Puig and Villarroya, 2013) and mitigation policies. Sustainable "green-blue" marine construction technologies can provide an efficient tool for managers and policy makers, reducing the environmental footprint of CMI. On top of this, integrating complex textures and designs to CMI, which promotes natural marine assemblages, also promote enhanced esthetic qualities that create urban marine nature zones, capable of elevating the environmental awareness among coastal communities.

SUMMARY

Slight modifications to concrete based CMI, taking into account concrete composition, surface texture and macro-design, have the potential to elevate their ability to support engineering species forming biogenic buildup, as well as associated filter feeding assemblages. The result is a unique benthic assemblage providing enhanced ecosystem services alongside with economic advantages such as elevated water quality, increased operational life span, structural stability, and absorption of hydrodynamic forces. These advantages are of great importance in CMI that must cope with aggressive salt-water environments.

The invention claimed is:

1. A marine infrastructure comprising:
   a concrete matrix, the concrete matrix comprising
   at least one type of cement,
   at least one aggregate comprising fine graded sand less than 4.75 mm, natural or crashed aggregates less than 0-2 mm, or any combination thereof, and
   potable water not containing more than 1000 parts per million of chloride or sulfates and free from lead, copper, zinc (<5 ppm) or phosphate (<5 ppm), the concrete matrix having a pH of less than 12 for use in promoting the growth of fauna and flora in aquatic environment,
   wherein:
   said concrete matrix has an average compressive strength of between 30 to 80 Mpa, water penetration depth under 7 bar of between 5 to 50 mm and chloride penetration resistance of between 500 to 2000 Coulombs.

2. The marine infrastructure according to claim 1, wherein said pH is less than 11.

3. The marine infrastructure according to claim 1, wherein said pH is between 9 to 10.5.

4. The marine infrastructure according to claim 1, wherein said pH of said concrete matrix is the pH of a top surface of said marine infrastructure.

5. The marine infrastructure according to claim 4, wherein the thickness of said surface is 5 cm or more.

6. The marine infrastructure according to claim 1, wherein salinity of aquatic environment is between 0 to 45 ppt.

7. The marine infrastructure according to claim 1, wherein said marine infrastructure has a surface roughness having a roughness grade of at least 12.

8. The marine infrastructure according to claim 1, wherein said marine infrastructure has surface roughness with an RA value of at least 50 microns and a surface texture with an RA value of 5-20 mm.

9. The marine infrastructure according to claim 1, wherein said concrete matrix has a weight per volume of between 1100 to 2500 Kg/m$^3$.

10. The marine infrastructure according to claim 1, wherein said concrete matrix has a weight per volume of between 1100 to 1800 Kg/m$^3$.

11. The marine infrastructure according to claim 1, wherein said concrete matrix comprises between 0 to 90% of a Portland cement.

12. The marine infrastructure according to claim 1, wherein said concrete matrix comprises at least one of microsilica/silica fume and Metakaolin and/or Calcium aluminate cements.

13. The marine infrastructure according to claim 1, wherein marine fauna and flora is selected from engineering and habitat forming species and corals and filter feeding organisms.

14. The marine infrastructure according to claim 1, wherein said enhancement of marine fauna and flora provides/facilitates deposition of inorganic matter on the surface of said structure can reach values between 50 to 1000 gr/m² after 12 months at a depth range of 0-10 m.

15. The marine infrastructure according to claim 1, wherein said promotion of growth of marine fauna and flora provides chlorophyll concentration on the surface of said structure can reach values between 100 to 800 μgr/m² after 12 months at a depth range of 0-10 m.

16. The marine infrastructure according to claim 1, wherein said promotion of growth of marine fauna and flora provides coral recruits on the surface of said structure is between 5 to 25 recruits per 15×15 surface area after 12 months at a depth range of 0-10 m.

17. The marine infrastructure according to claim 1, wherein said enhancement of marine fauna and flora provides coral settlement rates under laboratory conditions on the surface of said structure is between 5 to 60% after less than 1 month.

18. A method of promoting the growth of fauna and flora in aquatic environment comprising providing a marine construction infrastructure comprising a concrete matrix, the concrete matrix comprising at least one type of cement,
at least one aggregate comprising fine graded sand less than 4.75 mm, natural or crashed aggregates less than 0-2 mm, or any combination thereof, and
potable water not containing more than 1000 parts per million of chloride or sulfates and free from lead, copper, zinc (<5 ppm) or phosphate (<5 ppm), the concrete matrix having a pH of less than 12 for use in promoting the growth of fauna and flora in aquatic environment,
wherein:
said concrete matrix has an average compressive strength of between 30 to 80 Mpa, water penetration depth under 7 bar of between 5 to 50 mm and chloride penetration resistance of between 500 to 2000 Coulombs.

19. The method of claim 18, comprising providing an infrastructure composed of a concrete matrix having a surface pH of less than 12.

* * * * *